March 28, 1961 W. R. EDDY 2,976,723
APPARATUS FOR TESTING MATERIALS FOR RESISTANCE TO CRUSHING
Filed Dec. 26, 1956
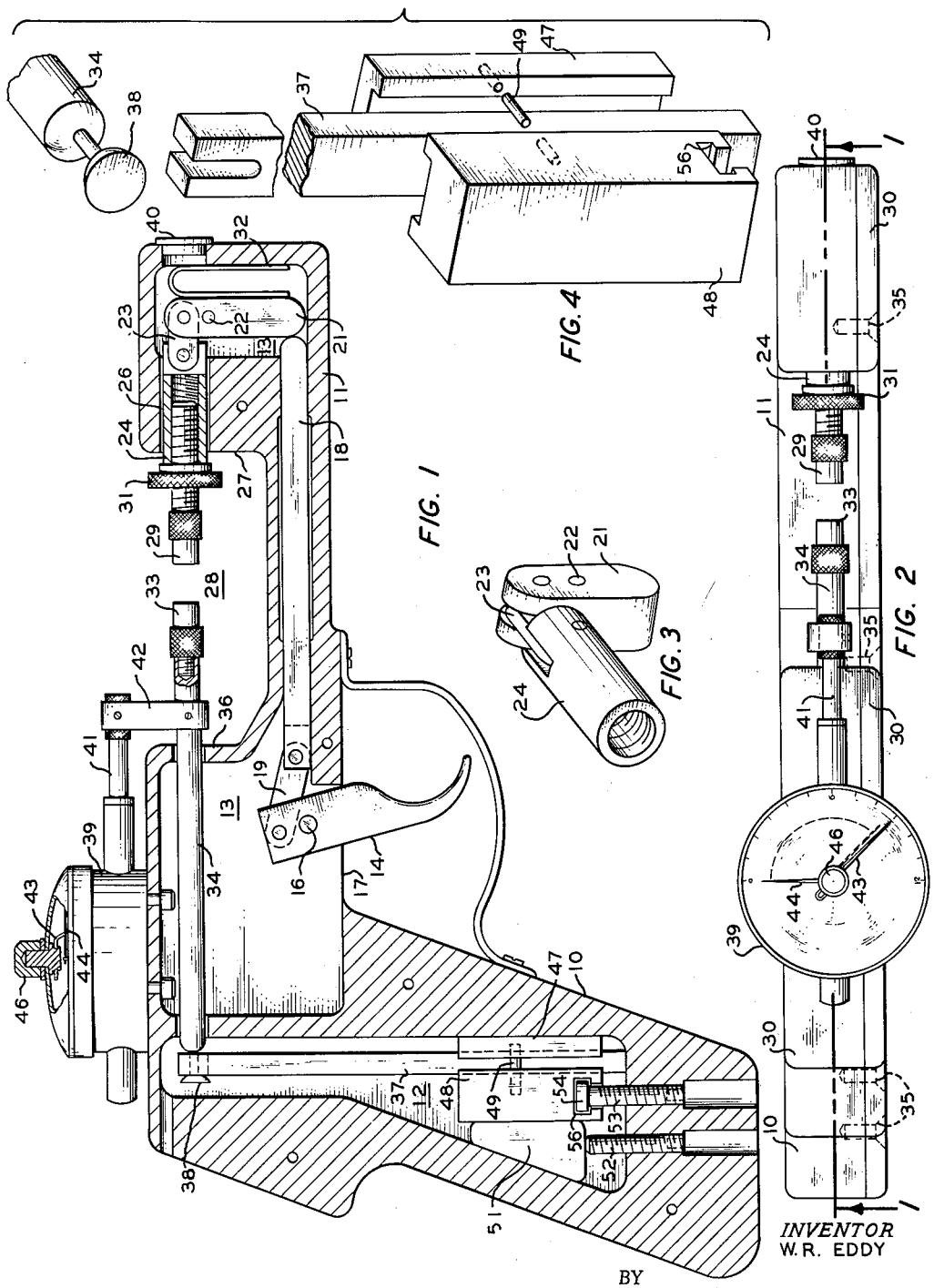
INVENTOR
W. R. EDDY
BY
Hudson and Young
ATTORNEYS United States Patent Office 2,976,723
Patented Mar. 28, 1961

2,976,723
APPARATUS FOR TESTING MATERIALS FOR RESISTANCE TO CRUSHING

William R. Eddy, Bartlesville, Okla., assignor to Phillips Petroleum Company, a corporation of Delaware Filed Dec. 26, 1956, Ser. No. 630,645
9 Claims. (Cl. 73—94)

This invention relates to apparatus for testing materials for resistance to crushing.

In the manufacture of materials sold or used in divided form, such as pellets, tablets, or prills, it is often advantageous to have said pellets, tablets, or prills of known or predetermined strength and other physical characteristics in order that premature disintegration in shipping, storage, or handling can be avoided. For example, large amounts of catalytic materials are used in pelleted form. These materials are frequently charged in large quantities to contacting towers wherein the bed of catalyst may be as deep as forty feet or more. In such instances, the catalyst pellets in the lower portion of the bed are subjected to the weight of the material above and unless the pellets possess sufficient inherent strength, crushing may result. Also, the catalyst pellets must withstand abrasion during charging of the tower or other handling. With articles such as pharmaceutical tablets, premature disintegration or breaking greatly reduces the value of the article from a commercial standpoint. The problem of measuring resistance to crushing is important not only from a use standpoint but is also important in order that the pelleting or tableting machine can be properly adjusted so as to produce tablets of the required physical characteristics.

While it has been known to measure the resistance to crushing of such materials by employing the forces resisting crushing in a manner to displace an elastic member such as a spring, and measuring the magnitude of displacement as indicative of the resistance to crushing, the manner in which the prior art devices accomplish this result involves rather cumbersome structures which neither conveniently fit in the average tool kit nor can conveniently be carried on the person of the user, or possess other inherent disadvantages.

An object of this invention is to provide an improved apparatus for testing materials for resistance to crushing. Another object of this invention is to provide an improved apparatus for testing materials for resistance to crushing, having dimensions such that it will conveniently fit in an average tool kit and/or can be conveniently carried on the person of the user. Another object of the invention is to provide an apparatus for testing materials for resistance to crushing wherein the force applying mechanism is segregated from the force indicating mechanism. Still another object of this invention is to provide an improved apparatus for testing materials for resistance to crushing which apparatus does not require a zero adjustment for every particle of material tested. Still another object of this invention is to supply an improved portable compact apparatus for testing materials for resistance to crushing, which apparatus incorporates a minimum of mechanical structure. Other aspects, objects and advantages of the invention will be apparent to those skilled in the art in view of this disclosure.

Thus according to the invention, there is provided an apparatus for testing materials for resistance to crushing which comprises: a frame; an arm projecting from said frame; a spring fixed at one end to said frame; a first compression member slidably carried by said frame and said arm, and connected at one end to said spring; a second compression member slidably carried by said arm, and aligned with but spaced apart from said first compression member; means connected to said second compression member for urging same toward said first compression member; and means connected to said first compression member for indicating the amount of deflection of said spring.

Figure 1 is an elevation partially in cross section, taken along the line 1—1 of Figure 2, of the device of the invention.

Figure 2 is a plan view of the device of the invention.

Figure 3 is a detail of a connecting link mechanism employed in the device of the invention.

Figure 4 is a detailed view of the means employed for varying the effective length of a spring in the device of the invention.

Referring now to the drawings wherein like numerals denote like elements, the invention will be more fully explained. As shown in Figure 1, the device comprises a generally vertically disposed frame 10, having an arm 11 projecting horizontally from and supported by said frame. As shown, said arm 11 is integral with frame 10. However, it will be realized that said arm can be separate from said frame and suitably attached thereto. Frame 10 and arm 11 are conveniently made from a solid bar of material and are provided with cavities 12 and 13, respectively, which are routed out of said bar. Of course, said frame 10 and arm 11 can be cast and a suitable mold employed to form said cavities. Trigger lever 14 is pivotally mounted at pintle point 16 within cavity 13 and extends without said cavity through an opening 17 provided in the bottom of arm 11. A push rod 18 is horizontally and slidably disposed within said cavity 13. A first link 19 pivotally connects said trigger lever 14 and one end of said push rod 18. Lever member 21 is pivotally mounted at pintle point 22 within cavity 13 at a point spaced apart from said trigger lever 14. One end of lever member 21 abuts the free end of push rod 18. The other end of said lever member 21 is pivotally connected by means of a second link 23 to one end of an anvil holder 24 slidably disposed in and extending through an opening 26 in wall 27 of the U-shaped recess 28 provided in arm 11. Said anvil holder 24 thus extends from cavity 13 into recess 28 with its longitudinal axis parallel to and in the same vertical plane as the longitudinal axis of push rod 18. A first anvil 29 is threadedly mounted in and extends from free end of said anvil holder 24. Lock nut 31 is provided to hold said anvil 29 in predetermined position with respect to anvil holder 24 and anvil 33. Anvil holder 24 together with anvil 29 comprises one of the compression members of the device. Spring 32 is provided to normally hold trigger lever 14, push rod 18, lever member 21, and anvil holder 24 in the position shown when the force is released from trigger lever 14.

The other compression member of the device comprises an anvil 33 threadedly mounted in the free end of anvil rod 34 which is disposed within U-shaped recess 28. Anvil rod 34 is carried by said arm 11 and frame 10 and slidably extends through wall 36 of recess 28, through cavity 13, and into cavity 12. The longitudinal axis of anvil rod 34 is aligned with the longitudinal axis of anvil holder 24. Bar spring 37 is vertically disposed within cavity 12 with one end rigidly fixed with respect to said frame 10, with the other end thereof being connected to one end of said anvil rod 34 at 38.

Cover plate 30, held in place by screws 35, is adapted to fit frame 10 and arm 11.

Indicating gauge 39 having push rod 41 extending therefrom is mounted on frame 10. Said push rod 41 is connected by means of strap 42 to anvil rod 34. Indicating gauge 39 is of the maximum registering type and is of known or conventional construction and per se forms no part of the invention. One suitable type of indicating gauge is that manufactured by the Federal Products Corporation, 1144 Eddy Street, Providence, R.I., and illustrated in their Catalog No. 41 as Model B6K. The gauge can be used as purchased, but is preferably modified to provide a maximum reading needle 43 having an intermediate offset portion which registers with needle 44, which in turn is actuated by means of the spindle shown, which is connected to rod 41 internally of the gauge casing. Maximum reading needle 43 can be manually moved or reset by means of knob 46.

Referring to Figure 4, bar spring 37 is slidably engaged by channel members 47 and 48, each having a channel in one side thereof. Dowel pin 49 connects said channel members 47 and 48. In the assembled apparatus, said channel members 47 and 48 cooperatively engage bar spring 37 on opposite sides thereof with channel member 47 being disposed between said bar spring 37 and a vertical wall of cavity 12. A wedge block 51 is disposed between channel member 48 and the angled wall of cavity 12. Set screw 52 is employed to hold wedge block 51 in wedged position between said angled wall and channel block 48, thus holding spring 37 in fixed relation to frame 10. Set screw 53 having head 54 adapted to cooperatively engage cove 56 in channel block 48 is employed, together with channel blocks 47 and 48 for varying the effective length of spring 37.

The device can be calibrated by loosening screw 52 which releases wedge block 51, which in turn releases the pressure of channel blocks 47 and 48 on spring 37. Said channel blocks 47 and 48, connected by means of dowel pin 49, can then be raised or lowered as a unit by means of screw 53 to change the effective length of spring 37. In practice, the dial of indicating gauge 39 is commonly graduated in increments of 0.0005 inch and channel blocks 47 and 48 can be moved up or down until 0.001 inch deflection of spring 37, as measured by the dial on indicator 39, corresponds to one pound of force applied to anvil 33. In calibrating the device a known force (dead weight) is applied directly to anvil 33. One convenient way of applying a known force to anvil 33 is to mount the device so that anvil rod 34 is in a vertical position in a vise with plug 40, spring 32, and anvil holder 24 removed. A T-rod is then inserted through opening 26 to abut anvil 33. Known weights can then be suspended from the cross arm of the T-bar so that they hang directly beneath anvil 33 and anvil rod 34.

In operation, a pellet, tablet, prill or other form of the material to be tested is placed between anvils 29 and 33 and force is applied manually to trigger lever 14. Said force is transmitted through push rod 18, lever member 21, anvil holder 24, and is exerted upon the material being tested through anvil 29. Said force will cause anvil rod 34 to deflect spring 37. Since rod 41 of indicating gauge 39 is connected to anvil rod 34, the amount of deflection of spring 37 will be directly indicated on the dial of said gauge. Said gauge starts registering said force immediately upon application of the force to the material and continues to register said force until the material collapses. At this point, indicating needle 44 will fall back and maximum reading needle 43 will record the maximum force applied to the material.

The device of the invention can be fabricated from any convenient material. One presently preferred material for frame 10 and arm 11, because of its light weight, relatively great strength, and ease of machining, is aluminum. The various parts such as trigger lever 14, push rod 18, lever member 21, anvils 29 and 33 can be preferably made from any suitable stainless steel. Bar spring 37 can be made from any suitable spring steel. It is apparent that the device is compact, rugged, and can be conveniently carried in an average tool kit or on the person of the user. The dimensions of the device being of the general shape of the automatic pistol facilitate carrying the device in a holster as an ordinary pistol is carried.

The device can be employed for testing a wide variety of materials. For example, when testing catalyst pellets, it is common practice to employ an indicating device 39 having a dial range equivalent to from 0 to 40 pounds of force. When testing an ammonium nitrate prill, it is common practice to employ an indicating device having a dial range equivalent to from 0 to 10 pounds of force. It is clear that spring 37, or the effective length of said spring, and/or indicating device 39 can be changed to accommodate any desired range of force.

It is to be particularly noted that the force applying mechanism comprising trigger lever 14, push rod 18, lever member 21 and anvil holder 24 is completely segregated from the indicating mechanism, i.e., the force is not measured until it has actually been applied to the material being tested. In other words, the applied force must be transmitted to and through the material being tested.

Various other modifications of the invention will be apparent to those skilled in the art in view of the above disclosure and the drawings and are believed to be within the scope of the invention.

I claim:

1. Apparatus for testing materials for resistance to crushing which comprises: a frame; an arm projecting from said frame; a bar spring fixed at one end to said frame; a first compression member slidably carried by said frame and said arm, with its axis transverse the axis of said spring, and connected at one end to said spring; a second compression member slidably carried by said arm, and aligned with but spaced apart from said first compression member; means connected to said second compression member for urging same toward said first compression member; and means connected to said first compression member for indicating the amount of deflection of said spring.

2. Apparatus for testing materials for resistance to crushing which comprises: a frame; an arm projecting from said frame; a bar spring rigidly fixed at one end to said frame; a first anvil mounted in one end of an anvil rod slidably carried by said frame and said arm with its axis transverse the axis of said spring, the other end of said rod being connected to said spring; a second anvil mounted in an anvil holder slidably carried by said arm with its axis aligned with the axis of said anvil rod, said first and second anvils being aligned but spaced apart; means for urging said anvil holder and said second anvil toward said first anvil; and means connected to said anvil rod for indicating the amount of deflection of said spring.

3. Apparatus according to claim 2 wherein said means for urging said anvil holder, together with said second anvil, toward said first anvil, comprises: a first lever operatively connected at one end to said anvil holder; and a second lever operatively connected to one end of a push rod, the other end of said push rod abutting the free end of said first lever.

4. Apparatus for testing materials for resistance to crushing which comprises: a frame; an arm projecting from and supported by said frame; a bar spring carried by and rigidly fixed at one end to said frame; an anvil rod slidably carried by said frame and said arm, with its axis transverse the axis of said spring, and connected at one end to the free end of said spring; a first anvil mounted in the other end of said anvil rod; an anvil holder slidably carried by said arm, the axis of said anvil holder being aligned with the axis of said anvil rod; a second anvil mounted in said anvil holder and aligned with but spaced apart from said first anvil; means carried by said arm and adapted to urge said anvil holder, together with said second anvil, toward said first anvil under manual pressure; and means connected to said anvil rod for indicating the amount of deflection of said spring.

5. Apparatus for testing materials for resistance to crushing which comprises: a frame; an arm, having a generally U-shaped recess in the top side thereof, projecting from and supported by said frame; a bar spring carried by and rigidly fixed at one end to said frame; an anvil rod slidably carried by said frame and said arm, one end of said anvil rod being connected to the free end of said bar spring and the other end of said anvil rod extending through one vertical wall of and into said recess; a first anvil mounted in said other end of said anvil rod; an anvil holder slidably carried by said arm and extending through the other vertical wall of and into said recess opposite said anvil rod; a second anvil mounted in said anvil holder and aligned with but spaced apart from said first anvil; means carried by said arm and adapted to urge said anvil holder, together with said second anvil, toward said first anvil under manual pressure; means carried by said frame and connected to said anvil rod for indicating the amount of deflection of said spring; and means for varying the effective length of said spring.

6. Apparatus for testing materials for resistance to crushing which comprises: a substantially vertically disposed frame; an integral arm, having a generally U-shaped recess in the top side thereof, projecting horizontally from and supported by said frame; a trigger lever pivotally mounted within a cavity provided in said arm and extending without said cavity through a first opening provided in the bottom of said arm; a push rod horizontally and slidably disposed in said cavity in said arm; a first link pivotally connected to said trigger lever and to one end of said push rod; a lever member pivotally mounted in said cavity in said arm at a point spaced apart from said trigger lever, one end of said lever member abutting the free end of said push rod; an anvil holder slidably extending through one vertical wall of and into said U-shaped recess from said cavity in said arm, the axis of said anvil holder being parallel to the axis of said push rod; a second link pivotally connected to one end of said anvil holder and to said lever member; a first anvil mounted in the other end of said anvil holder within said U-shaped recess; an anvil rod in axial alignment with the axis of said anvil holder and slidably extending through the other vertical wall of and from said U-shaped recess into a cavity provided in said frame; a bar spring vertically disposed within said cavity in said frame, one end of said bar spring being rigidly fixed with respect to said frame and the other end being connected to one end of said anvil rod; a second anvil mounted in the free end of said anvil rod within said U-shaped recess and aligned with but spaced apart from said first anvil; indicating means mounted on said frame and connected to said anvil rod for measuring the amount of deflection of said bar spring; and means for varying the effective length of said bar spring.

7. Apparatus according to claim 6 wherein said means for varying the effective length of said bar spring comprises: a first channel block and a second channel block, each having a channel in one side adapted to slidably engage said bar spring, operatively disposed on opposite sides of said bar spring; said first channel block being slidably disposed between said bar spring and a vertical wall of the cavity in said frame; a plurality of dowel pins connecting said channel blocks; a wedge block slidably disposed between said second channel block and an angled wall of said cavity in said frame; and means for raising and lowering said wedge block, and said connected channel blocks, relative to one another.

8. Apparatus for testing materials for resistance to crushing which comprises: a frame; an arm, having a generally U-shaped recess in the top side thereof, projecting from said frame; a spring fixed at one end to said frame; a first compression member slidably carried by said frame and said arm, connected at one end to said spring so that said spring resists movement thereof, and having its other end extending through one vertical wall of and into said recess; a second compression member slidably carried by said arm with one end extending through the opposite vertical wall of and into said recess in alignment with but spaced apart from said other end of said first compression member; means connected to said second compression member for urging same toward said first compression member; and means connected to said first compression member for indicating the amount of deflection of said spring.

9. Apparatus for testing materials for resistance to crushing which comprises: a frame, an arm, having a generally U-shaped recess in the top side thereof, projecting from said frame; a bar spring fixed at one end to said frame; a first compression member slidably carried by said frame and said arm with its axis transverse the axis of said frame, connected at one end to said spring, and having its other end extending through one vertical wall of and into said recess; a second compression member slidably carried by said arm with one end extending through the opposite vertical wall of and into said recess in alignment with but spaced apart from said other end of said first compression member; means connected to said second compression member for urging same toward said first compression member; and means connected to said first compression member for indicating the amount of deflection of said spring.

References Cited in the file of this patent

UNITED STATES PATENTS

| | | |
|---|---|---|
| 1,630,110 | Cole | May 24, 1927 |
| 1,819,232 | Cropper | Aug. 18, 1931 |
| 2,041,869 | Smith et al. | May 26, 1936 |
| 2,250,941 | Zimmerman | July 29, 1941 |
| 2,626,522 | Brown | Jan. 27, 1953 |
| 2,645,936 | Albrecht | July 21, 1953 |
| 2,699,060 | Safford | Jan. 11, 1955 |
| 2,737,048 | Erp | Mar. 6, 1956 |